April 3, 1928.

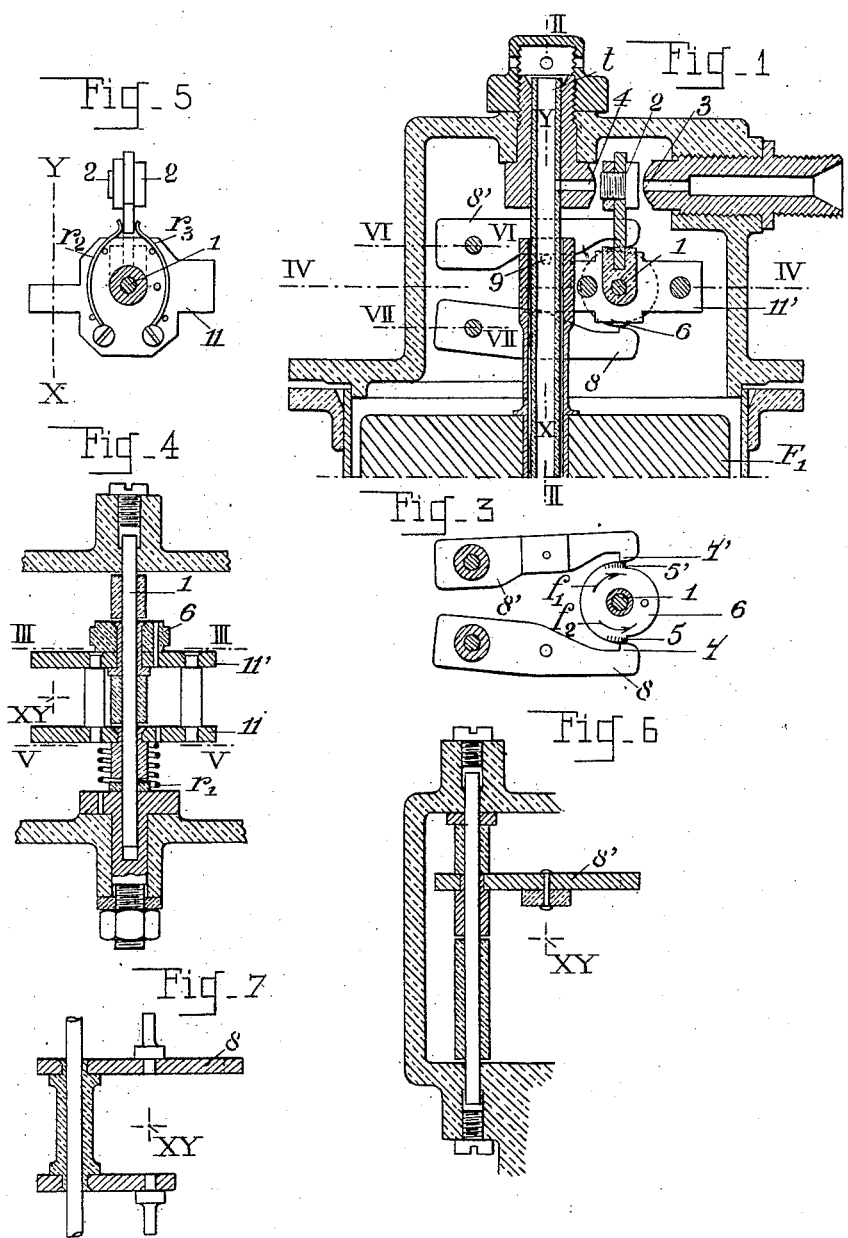

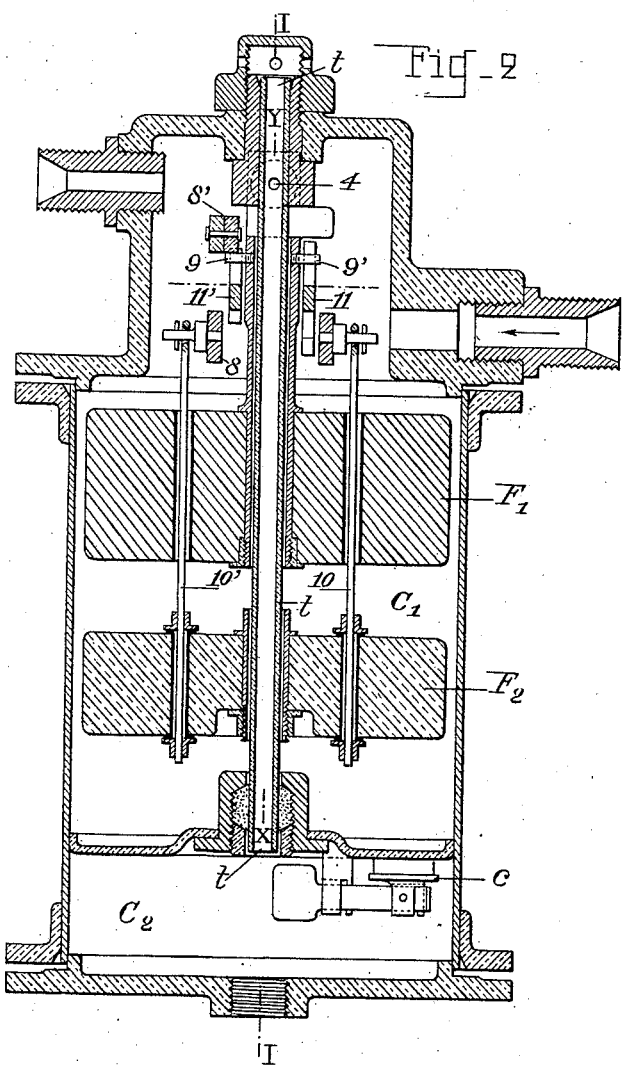

A. P. JAPY 1,664,927

PULSOMETER

Filed April 7, 1925

Inventor
A. P. Japy
by Langner, Parry, Card & Langner
Attys

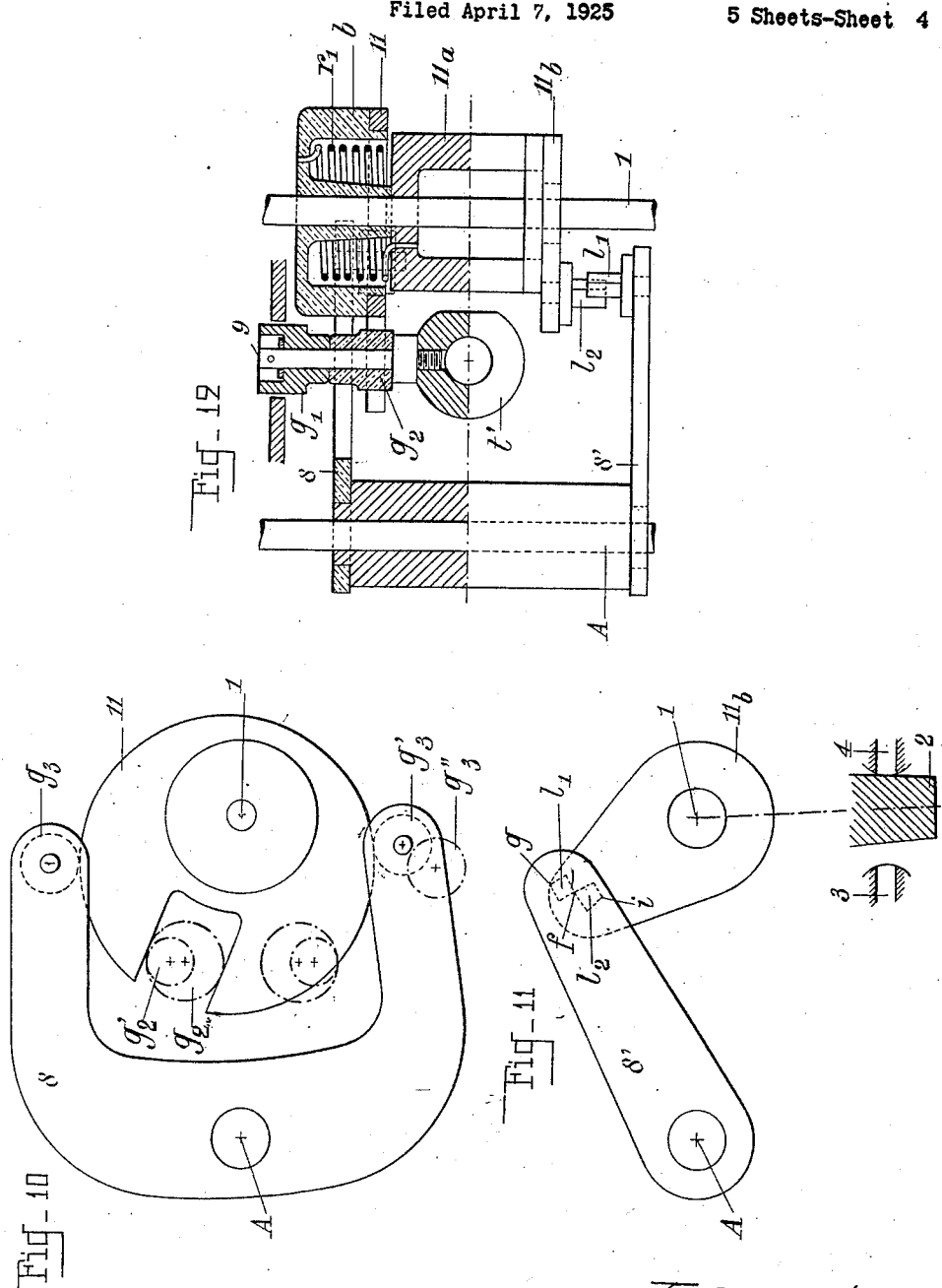

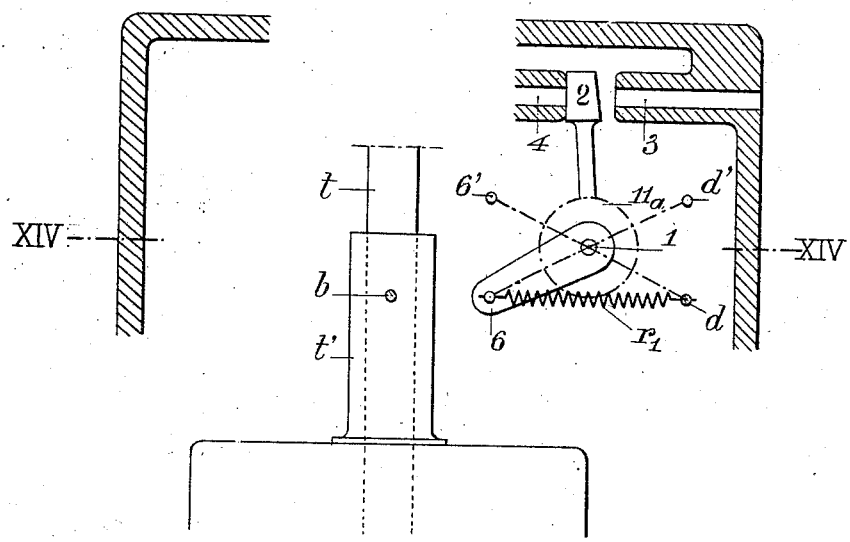
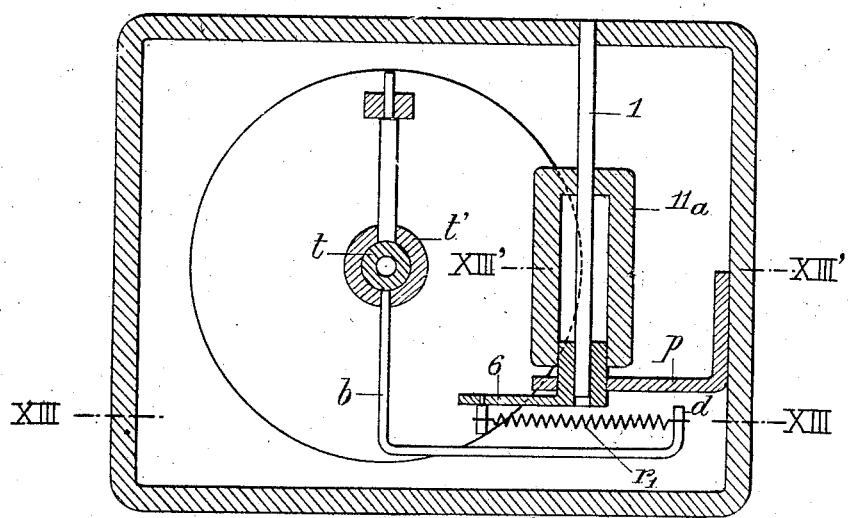

Patented Apr. 3, 1928.

1,664,927

UNITED STATES PATENT OFFICE.

ALBERT PAUL JAPY, OF BERNE-SELONCOURT, FRANCE.

PULSOMETER.

Application filed April 7, 1925, Serial No. 21,418, and in France April 9, 1924.

My invention has for its object a pulsometer which is so constructed that each complete stage will correspond to the passage of a constant volume of liquid, said pulsometer operating under the effect of a vacuum or simply by gravity.

The apparatus may be combined with means for registering the number of pulsations and serving as a gauging meter, and also with a system of relays, in the case of operation on the vacuum principle.

The said pulsometer is characterized by the fact that a suitable float disposed within a closed chamber serves to control the admission of the liquid by means of releasing or trigger devices adapted for instantaneous action; said devices are released for exactly identical positions of the float, so that the quantity of liquid admitted at each pulsation will be absolutely constant.

To carry my said invention into effect, I may obviously utilize any suitable release mechanism which will effect the closing of the orifices in a sufficiently instantaneous manner in order that the quantity of liquid admitted at each pulsation shall be independent of the output of the inlet orifices.

However, by way of example and in order to more clearly illustrate the present description, I have represented in the appended drawings a particular form of construction of the said pulsometer.

Fig. 1 is a partial section on the line I—I of Fig. 2.

Fig. 2 is a complete vertical section on the line II—II of Fig. 1.

Fig. 3 is partial sectional elevation, on the line III—III of Fig. 4.

Fig. 4 is a horizontal section on the line IV—IV of Fig. 1.

Fig. 5 is a vertical sectional elevation, on the line V—V of Fig. 4.

Fig. 6 is a partial horizontal section on the line VI—VI of Fig. 1.

Fig. 7 is a partial horizontal section on the line VII—VII of Fig. 1.

Fig. 10 is a partial detail view, in side elevation, of another form of construction of the release mechanism with automatic locking, the object of my invention; this view corresponds to Fig. 8.

Fig. 11 is a partial diagrammatic view showing the position of the said release mechanism when the same is disengaged for the opening of the suction orifice.

Fig. 12 is a general view in horizontal section, corresponding to Fig. 9.

Fig. 13 is a vertical sectional elevation, on the lines XIII—XIII and XIII'—XIII' of Fig. 14, of another form of construction of the said device.

Fig. 14 is a horizontal section on the line XIV—XIV of Fig. 13.

Figure 8:
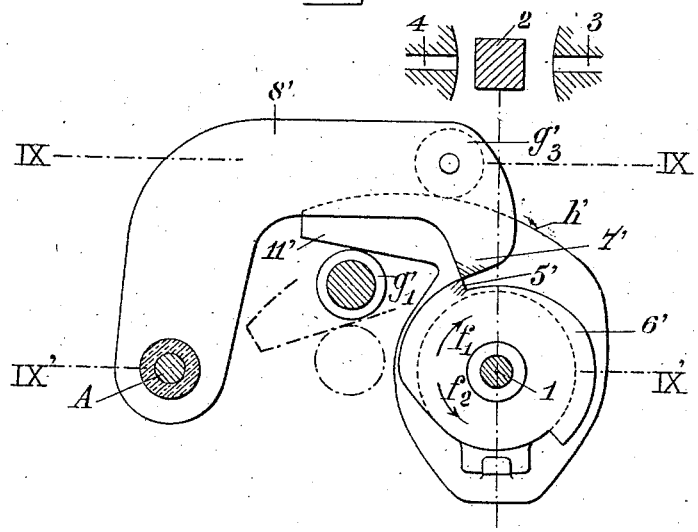
Fig. 8 is a partial elevational view on the line VIII—VIII of Fig. 9, and corresponding to Fig. 1, of a release device controlled by a single float.
Figure 9:
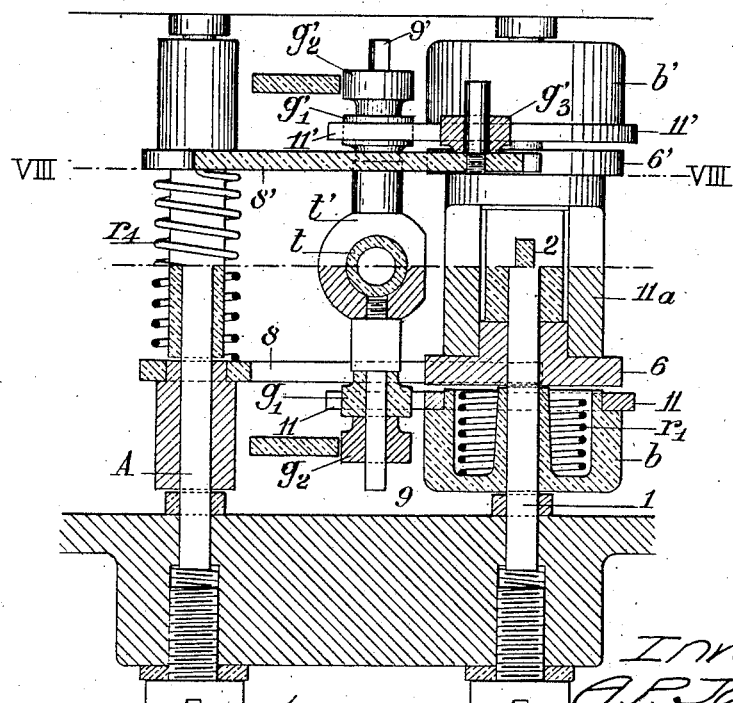
Fig. 9 is a horizontal view of the same device wherein the upper part is shown in half section on the line IX—IX and the lower part in half section on the line IX'—IX' of Fig. 8, the said horizontal view corresponding to Figures 4, 6 and 7.

In the form of construction shown in Figs. 1 to 7, it is supposed that the said pulsometer is operated on the vacuum principle. It is therefore connected by conduits of suitable size firstly to the tank containing the liquid to be elevated, and secondly to a source of vacuum acting by suction to elevate the liquid into the pulsometer. The apparatus further comprises an orifice affording atmospheric connection when the vacuum orifice is closed.

Each pulsation comprises two stages:

1. Period of filling of the pulsometer chamber, the vacuum orifice being open; a float acts when ascending to set the trigger mechanism in one direction, and then presses a trigger which abruptly closes off the vacuum and opens the atmospheric inlet, so that the filling of the device is thus stopped.

2. Period of discharge; atmospheric pressure prevails in the apparatus, and the liquid is evacuated through a suitable orifice which is opened at this time; the action of the floats will set the trigger mechanism in the other direction, while the vacuum orifice remains closed, and will then press another trigger in order to abruptly open the vacuum orifice and to close the atmospheric inlet and the discharge orifice.

The said apparatus essentially comprises a recipient $C_1$ in which the periods of vacuum and atmospheric pressure take place in succession. The liquid enters the said recipient during the vacuum periods. A suitable conduit connects the recipient with the gauging meter and optionally with the relay or set of relays disposed in stages. The recipient further comprises the chamber $C_2$ which is constantly placed under atmospheric pressure by the central tube $t$ whose axis is X—Y. During the periods of atmospheric pressure, the liquid will pass from $C_1$ to $C_2$ through the clack valve $c$.

The releasing mechanism is constructed as follows:

On the axle 1 is pivoted a clack valve 2 which may occupy either the position of contact with the end of the conduit 4, this corresponding to the closing of the atmospheric inlet and to the opening of the vacuum orifice (period of supply of the chamber $C_1$)—or the position of contact with the end of the conduit 3, which corresponds to the atmospheric inlet and to the closing of the vacuum orifice (period of supply of the chamber $C_2$).

Fig. 1 shows the said valve when proceeding from the first to the second position.

Let it be supposed that the said valve is in contact with the seat 3 of the vacuum orifice, the supply of the chamber $C_1$ with liquid being now complete. Atmospheric pressure will be freely exercised in the chamber $C_1$ through the orifice 4, and due to the weight of the liquid in the chamber $C_1$ the balanced valve $c$ will open, thus affording passage for the liquid from the chamber $C_1$ into the chamber $C_2$. It should be observed that at this time the chamber $C_1$ is still filled with liquid, and the floats $F_1$ and $F_2$ will be upwardly urged; the float $F_1$ will maintain the trigger 8' in the upper position, whilst the float $F_2$ will press the trigger 8 against the cam 6.

The cam 6 is secured to the rocker device 11, 11', which is mounted loose upon the axle 1 but is permanently urged in the direction of the arrow $f_1$ (Fig. 3) by the spring $r_1$ (Fig. 4) which is attached at one end to the said rocker and at the other to a stationary point. To the arm 11 of the rocker is attached a spring $r_2$ (Fig. 5) which is weaker than $r_1$ and urges the valve 2 in the same direction $f_1$ as the spring $r_1$, so that under the action of the spring $r_1$ the rocker will swing into the position $f_1$, thereby impelling the valve 2 upon the seat 3 through the medium of the spring $r_2$.

The said rocker, due to the yielding of the spring $r_2$, will somewhat exceed the stopping point of the valve 2, and this excess of movement will allow the notch 5 in the cam 6 to exceed—towards the left, Fig. 3—the end 7 of the opening trigger or release arm 8. The said trigger arm, under the action of the float $F_2$, will wind up and set the cam 6 in the position for closing the vacuum orifice. By reason of the flexibility of the spring $r_2$ the aggregate consisting of the said rocker and cam will be subsequently enabled to butt against the end 7; the vacuum orifice remains in the closed position during this operation.

This method of operating is necessary, for when the level is lowered in the chamber $C_1$, the float $F_1$ will descend. The float rods 9, 9' (Fig. 2) bear upon the arms 11 and 11', of the rocker device which will rotate with the cam 6 according to $F_2$ until the notch 5 engages the end 7. The level of the liquid in the chamber $C_1$ continues to descend; the float $F_1$ which is now entirely out of the liquid will be suspended (by 9, 9') from the rocker arms 11 and 11'.

As the level continues to descend, the float $F_2$ will descend at a stated time. By means of the rods 10, 10' it will lower the opening trigger arm 8. When the end 7 of said trigger arm becomes disengaged from the notch 5 of the cam 6, the weight of the float $F_1$ will turn (according to $f_2$) the aggregate of the rocker and cam, and then through the medium of the spring $r_3$ (Fig. 5) the valve 2 in the same direction $f_2$.

The valve 2 is now upon its seat 4 (atmospheric connection) and the vacuum orifice is open. Due to the flexibility of the spring $r_3$ the notch 5' of the cam 6 will proceed forwardly of the end 7' of the trigger arm 8' whereby the said cam will be locked in this position. In virtue of the rotation of the said cam by means of the float $F_1$, the spring $r_1$ will be placed in the cocked position.

By reason of the vacuum prevailing in the chamber $C_1$, the liquid will enter the said chamber, and this will cause the balanced valve $C$ to close 7 the chamber $C_2$ being constantly under atmospheric pressure. The float $F_2$ will at first endeavour to rise, but it will be at once arrested by the trigger arm 8 which is urged against the cam 6 by the rods 10 and 10'.

The level of the liquid rises in the chamber $C_1$, and the float $F_1$ will rise therewith. The said rocker and cam will turn slightly in the direction of $f_1$ under the action of the springs $r_1$ and $r_2$. The end 7' and the notch 5' are now in engagement. Due to the flexibility of the spring $r_3$, the valve 2 will be maintained against the atmospheric inlet 4.

The level of the liquid now further rises. At a stated time, the float $F_1$ will raise the trigger arm 8' by means of its rod 9. When the end 7' is released from the notch 5' under the action of the spring $r_1$, the vacuum orifice will be abruptly closed; the liquid is no longer supplied to the chamber $C_1$, and the liquid now commences to circulate from the chamber $C_1$ into the chamber $C_2$, and the same cycle of operations is repeated.

The trigger action of the ends of the said arms and the notches in the cam will take place in the most accurate and responsive manner, so that the unit volume of the pulsometer will have the maximum uniformity.

In order to provide a very accurate fluid meter, it will be simply necessary to register the pulsations of the device, in any suitable manner.

The pulsometer provided with the trigger arrangement as hereinbefore set forth is capable of functioning without the use of a vacuum, and solely by the action of gravity.

It is obvious that herein the liquid recipient is placed at a higher level than the pulsometer. Atmospheric pressure freely prevails in the chambers $C_1$ and $C_2$. The liquid is supplied through the orifice 3. The valve 2 operates only upon one face, and solely to open and close the orifice 3. The valves 2 and $c$ are mechanically connected together so that when the supply of liquid is cut off at 3, the valve $c$ will be open, but when 3 is open, $c$ will be closed.

The registering device for the pulsations will be controlled by any suitable mechanical means connected at one end with the adding counters and at the other end with the elements of the pulsometer having a periodic motion.

In the second embodiment of the invention, shown in the drawings, the trigger device is under the control of a single float. The said trigger or release mechanism operates on the same principles as the device set forth with reference to Figs. 1 to 7, but it is modified in such manner as to be cocked and released in both directions by a simple float. This release mechanism further comprises various improvements which might also be employed with facility in the preceding mechanism, or in any analogous mechanism, and thus the release device can be operated with greater facility and smoothness. In the said improvements I utilize suitable rollers, as well as contact members having a curved outline, in order to raise the said trigger arms in their portion coacting with the corresponding rollers.

The float, not shown, is traversed at the centre by a hollow rod $t$ stationary which affords a constant atmospheric connection for the lower chamber. It comprises, in the same manner as in the form previously described, a tube $t'$ concentric with the tube $t$ with which it is connected; the tube $t'$ is slidable on the tube $t$ and is provided—in the device according to the present modification—with the lateral rods 9 and 9' which serve as a common axle for the rollers $g_1$, $g'_1$ controlling all the movements of the release device and for the rollers $g_2$, $g'_2$ which bear upon vertical guides and hold the said float against rotation on the rod $t$.

The said mechanism operates by double release, as in the device shown in Figs. 1–7. In the present embodiment, the roller $g_1$ controls one of the trigger arms 8 corresponding to the movement for the opening of the suction orifice and for the simultaneous closing of the vacuum orifice, whilst the roller $g_1$ controls the second trigger arm 8' corresponding to the inverse movement. Fig. 8 shows only one-half of the mechanism; the other half would be represented in vertical projection and in the symmetrical position with respect to the line IX—IX'.

The arms 8 and 8', instead of having independent axes as in Figs. 1–7, now have common axis. A common spring $r_4$, concentric with the rod A, is attached at its respective ends to the arms 8 and 8' and urges the said arms against the respective cams 6 and 6'.

The said cams 6 and 6' have the same function as the single cam 6 set forth in the main patent; each cam carries the trigger end 5 (or 5') co-operating with the respective end 7 or 7' of the corresponding arm 8 or 8'.

The rocker properly so called is now reduced to a simple turned member II to which are secured the cams 6 and 6'. The arms II and II', instead of being rigid and integral with the same, are now constructed in the forms of keys II and II' secured to the barrels $b$ and $b'$ which have their axis in common with the rocker and the clack valve 2. The said keys serve to lift the respective trigger arms, and comprise a back part which has a curved outline, for instance a spiral $h$, $h'$ co-operating with the respective roller $g_3$, $g'_3$ mounted on the trigger arm 8, 8'. In virtue of this special outline, the variations in the vector of the roller $g_3$, $g'_3$ will be proportional to the angular variations of the said key.

In each of the barrels $b$ $b'$ carrying the keys (II) and (II') is disposed a respective spring $r_1$, $r'_1$ which is attached at one end to the barrel and at the other to the cam.

The said springs serve to rotate the combination of the rocker and valve in the direction $f_1$ or $f_2$ when the triggers are released. Suitable springs $r_2$ and $r_3$, which are not shown but are analogous to the springs described with reference to Figures 1–7, have a like function and urge the valves 2 against the orifices 3 or 4.

The operation is as follows:

When the float ascends (filling period of the upper chamber $C_1$) the roller $g_1$ will raise the key II' which cocks the spring $r'_1$. At the same time, the key II' raises by means of its spiral outline $h'$ the roller $g'_3$ whose axle is secured to the trigger arm 8'. The end of said arm is released from the end 5' of the cam 6', and under the action of the spring $r'_1$, the rocker II$^a$ and the valve 2 will turn abruptly in the direction $f_1$. This motion will close the orifice of the vacuum 3 and will open the air inlet 4. The liquid will thus pass from the chamber $C_1$ into the chamber $C_2$, as above set forth with reference to Figures 1–7. On the descend, the single float will perform analogous functions, by reason of its roller $g_1$, the key II, the roller $g_3$, the arm 8 and the cam 6. The orifice 3 will be opened and the orifice 4 will be closed, and so on.

It should be noted that in virtue of the particular form of the hereinbefore described device the volumetric regulation of the apparatus can be effected with great facility. It is simply necessary in order to vary the amount of liquid admitted for each pulsation, to vary the diameter of one or more of the rollers $g_1$, $g_3$, $g'_1$, $g'_3$. Due to this increase in the diameter, the unit volume of the apparatus will be diminished, in as much as the course of the float is reduced.

The modified form of construction shown in Figs. 10, 11 and 12 is essentially characterized by the fact that the element or elements which are utilized as trigger devices and whose outward or disappearing motion affords the release at the proper time, are necessarily connected with the actuating element, i. e. the float or floats, according to invariable operating conditions, so that the device cannot be released unless the said actuating element (float or floats) occupies certain definite positions, and in this manner all improper release action will be obviated.

The said connection between the release device or devices and the controlling element (float or floats) may be effected in any suitable manner, and all modifications of the same will be comprised in my said invention. In the particular example shown in Figs. 10, 11, and 12, the double release is effected by means of a single double armed key and a single release tappet, said parts being so disposed as to afford a double automatic locking during the ascent and the descent of the float.

The tube $t'$ secured to the float is provided with a single axis $q$ carrying the guide roller $g_1$ and the actuating roller $g_2$; the latter is constantly engaged in the notch in the key II; said key II is an eccentric which is loose on the axle I. The float when rising and descending will turn the key II through a certain angle in the respective direction. The key II is in permanent contact with the rollers $g_3$ and $g'_3$ of the release key 8 which is loose on the axle A.

The element 8 has secured thereto a release arm 8' which carries an escapement stud $l_1$ coacting with the like stud $l_2$ mounted on the rocker II$^a$ through the medium of the escapement disk II$^b$ which is secured to II$^a$, and to which the same is attached.

The rotation of the key II due to the motion of the float will raise the key 8 (position $g_3$ $g'_3$ of the rollers) or will lower the said key (position $g''_3$) and hence the arm 8'. The rotation of the key II will also cock in one or the other direction a single spring $r_1$ attached at one end to the barrel $b$ to which is secured the key II, and at the other end to the rocker II$^a$.

The release, i. e. the pivoting of the valve 2, will thus take place in a given direction when the contact ceases at the point $f$ between the studs $l_1$ and $l_2$, and in the other direction when the contact ceases at the point $g_1$ between the said studs. As long as the said contacts (controlled by the position of the float) do not take place, the rollers $g_3$ $g'_3$ will lock the escapement against action and the latter cannot take place accidentally, since the rollers will absolutely prevent all motion of the release arm except what is due to the control exercised by the float.

The unit volume of output of the apparatus can be regulated by changing the diameter of the roller $g_2$; should the latter have a small diameter $g'_2$, the extreme points of the stroke of the float will be farther apart, but if a large diameter $g_2$ is employed, the said points will be closer together. Whatever be the diameter adopted, the release will always occur for exact and determined positions of the float, and the locking action will be effected in the same conditions.

In the form of construction set forth in Figs. 13 and 14 the release and trigger arms are reduced to a single arm 6 bound to the rocker 11$^a$. To the end of the arm 6 is attached a spring $r_1$ affixed, on the other hand, to the rod $t'$ the said rod being bound to the float.

On the one side, the axis 1 turn still in the box of the apparatus, but, on the other side, is cut off in the arm 6, in order to permit the free displacement of the spring $r_1$. A bracket $p$, fixed on the box, support the axis 1 by a bearing of the arm 6.

The Figure 13 shows the float at the lower point of its course. The clack valve 2 closes the orifice 4, and opens the orifice 3. The liquid enters under the effect of the existing depression. The float rises.

When the point $d$ on which the spring $r_1$ is hooked to the arm $b$ has just overreached the position $d'$, the said spring $r_1$, causes the arm 6, bound to the rocker 11$^a$, to be rocked instantaneously. This rocker, as before described with reference to the Fig. 1–12, carries the clack valve 2 away, and this clack valve closes the orifice 3 up and opens the orifice 4. The arrival of the liquid is interrupted. But the liquid previously introduced can be delivered to the lower chamber.

The level goes down and the float follows. When the extremity $d$ of the arm $b$ has reached the point $d$ the reverse movement takes place, and so forth.

Having now described my said invention and the manner in which the same is to be performed, what I claim is:

1. A pulsometer, comprising, in combination, a valve, floats, means operated by the floats for actuating the valve, said means including, a releasing detent and a quick stop escapement for operating said detent.

2. A pulsometer, comprising, in combination, a double clack valve, floats, a quick release device for the valve, means for cocking and releasing the device by movement of the floats, the release device comprising detent elements secured to the valve and cooperating detent elements operably connected to the floats.

3. A pulsometer, comprising, in combination, a float, a double clack valve, a double-acting device for quick release of the valve, the float including tappets for cocking the device in a given direction by its ascent and for effecting the corresponding release of the device at the end of the ascent, and for cocking the device in the reverse direction by its descent and effecting the corresponding release at the end of its descent.

4. A pulsometer, comprising, in combination, a float, a double clack valve, a double-acting device for quick release of the valve, said device comprising cams having curved outlines, projections on the float cooperating with the cams, detent members, members elastically connected to the valve and having detents cooperating with the detent members, and a spring connection between the cams and the detent members.

5. A pulsometer, comprising, in combination, a float, a double clack valve, a double-acting device for quick release of the valve and comprising a curved cam, release elements having projections slidable on the cam and carrying detents, members elastically connected to the double valve and having detents cooperating with the first said detents, said members being spring connected to the cam.

6. A pulsometer comprising, in combination, a float, a double clack valve, a double-acting device for quick release of the valve and comprising a cam having a curved outline, a recess in the cam, a projection disposed on the said float cooperating with the recess whereby to prevent the cam from assuming any positions other than those imparted to it by the float.

7. A pulsometer, comprising, in combination, a float, a double clack valve, a double acting device for quick release of the valve and comprising a cam of curved outlines, a recess in the cam, a projection cooperating with the recess and carried by the float, and a strap member including two branches the ends of which slide on the curved portions of the cam.

8. A pulsometer, comprising, in combination, a float, a double clack valve, a double-acting device for quick release of the valve and comprising, an eccentric cam of substantially circular shape, a double release device, a tappet on the device, a detent on the tappet, a rocker arm elastically secured to the valve, a tappet on the rocker arm, a detent on the tappet and cooperating with the first said detent, the rocket arm being mounted on a common axle with the cam and a spring connection between the cam and rocker arm.

9. A pulsometer, comprising, in combination, a float, a double-acting valve release device, a rocker arm controlled by the release device, a double valve, a stem on the valve, and spring strips at either side of the stem elastically mounting the valve on the rocker arm.

10. A pulsometer, comprising, in combination, a valve release device, a valve elastically connected to the device, the release device comprising a float controlled rod, a rocker, an arm on the rocker, a spring attached at one end to one end of the rod and at the other end to the free end of the arm for biasing the arm, and means whereby the movement of the float controlled rod when at the end of its stroke, effects a reversal of the direction in which the spring biases the arm.

11. A pulsometer comprising, in combination, floats, a double clack valve, a mechanism for double release of said valve, means for cocking and releasing the mechanism by movement of the floats, and an elastic connection between said valve and said mechanism.

12. A pulsometer comprising, in combination, a float, a double clack valve, a double acting device for quick release of said valve comprising, an axle, a curved outline cam having two parts situated on either side of the axle, a recess in the cam, a project on the float cooperating with the recess, and a strip member including two branches the ends of which slide on the curved parts of the cam whereby to positively control the position of the release element by the position of the cam and hence by the position of the float.

13. A pulsometer, comprising, in combination, a float, a double clack valve, a double acting device for quick release of said valve, comprising a cam, a double release element, including a strip member having two branches the ends of which slide on the curved portion of the cam, an arm, a foursided escapement projection of curvilinear quadrilateral cross section carried at one end of the arm, a second arm elastically connected to the valve, a like escapement projection mounted on the second arm and coacting with the first said escapement projection.

14. In a pulsometer, a valve, a releasing detent for actuating the valve, a quick stop escapement for operating said detent and means actuating the quick stop escapement, said means being controlled by the level of the liquid.

In testimony whereof I have signed my name to this specification.

ALBERT PAUL JAPY.